Aug. 23, 1938.　　　　G. H. MAINS　　　　2,128,097
ACID RESISTING LAMINATED PRODUCT
Filed March 15, 1934
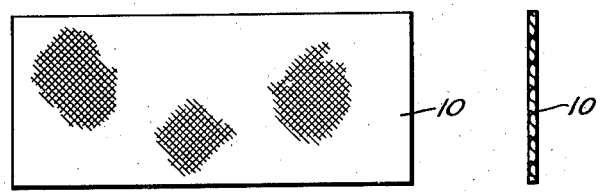
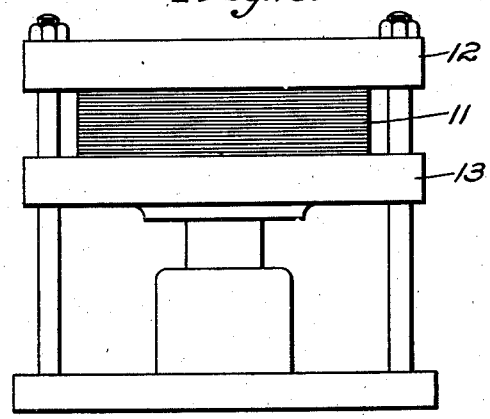
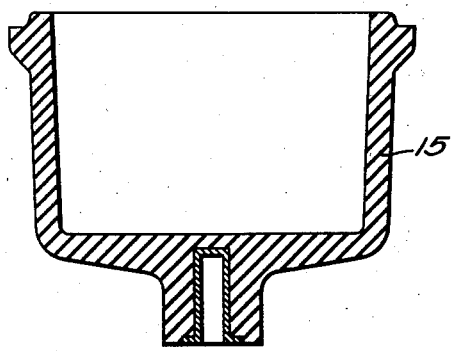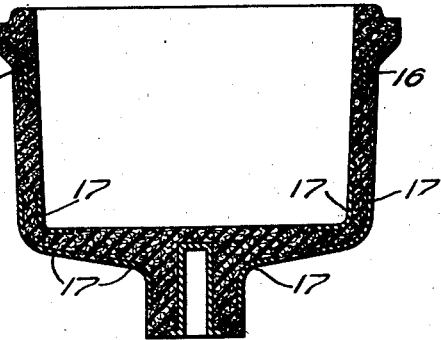
WITNESSES:
INVENTOR
Gerald H. Mains.
BY
ATTORNEY Patented Aug. 23, 1938

2,128,097

UNITED STATES PATENT OFFICE 2,128,097

ACID RESISTING LAMINATED PRODUCT

Gerald H. Mains, Murrysville, Pa., assignor to Westinghouse Electric & Manufacturing Company, East Pittsburgh, Pa., a corporation of Pennsylvania Application March 15, 1934, Serial No. 715,611

4 Claims. (Cl. 117—27.5)

The invention relates generally to molded laminated acid resisting products and methods of making them.

In some industries, containers and other apparatus that are continuously exposed to strong acids, such for example as a 10% solution of sulphuric acid, have a short life. Vessels and apparatus fabricated from cellulosic fabrics impregnated with resinous binders have been tried but their service is not satisfactory because the acid will attack and destroy the cellulosic materials and thereby greatly weaken the vessels and other apparatus. Other materials have been tried in place of cellulosic materials but the same weakness results.

The object of the invention is to provide a molded laminated product which will not deteriorate when exposed to acids.

It is also an object of the invention to introduce a method of working acid resisting materials to make molded laminated products.

The invention accordingly comprises the several steps and the relation and order of one or more or such steps with respect to each of the others and the article possessing the features, properties and relation of elements which are exemplified in the following detailed disclosure and the scope of the application of which will be indicated in the claims.

For a fuller understanding of the nature and objects of the invention, reference should be had to the following detailed description taken in connection with the accompanying drawing, in which:

Figure 1 is a top plan view and end elevation of a fabric woven in accordance with the teachings of this invention, Fig. 2 is a view in side elevation of a press showing the manner of applying heat and pressure to the assembled composite body, Fig. 3 is a view in side elevation of a product or plate fabricated according to the teachings of this invention, Fig. 4 is a view in cross-section of a spinning bowl suitable for such industries as the artificial silk industry, manufactured in accordance with this invention, and Fig. 5 is a view in cross-section of a modified type of spinning bowl.

It has been found that several kinds of asbestos are capable of resisting acids. Blue or African asbestos possesses acid resistant properties to a marked degree. However, the blue asbestos is not sufficiently fibrous to permit the utilizatiton of it in the making of laminated molded products.

It has been found that by mixing a predetermined amount of an organic fibrous material such as wool, silk or a fibrous cellulosic material with the blue asbestos that it may be woven into a fabric which possesses sufficient flexibility and strength to withstand the operations involved in impregnating and molding the material to the desired shape to produce vessels and apparatus suitable for the industries. This mixture of blue asbestos and cellulose may be woven into fabrics of suitable weights to facilitate impregnation and molding. Fabrics ranging from 12 to 24 ounces per square yard have been woven, impregnated and molded with success.

In making fabrics which are suitable for molding operations, good results have been obtained by mixing from 5% to 20%, by weight, of a fibrous cellulosic material such as cotton with from 95% to 80%, by weight, of blue or African asbestos. When a mixture of this kind is made, it may be spun into yarn which may be woven into a fabric such as illustrated at 10 in Fig. 1. The cotton fibers give the fabric 10 sufficient strength to withstand the operations involved in impregnating it with a binder and molding it to a predetermined shape.

When the fabric has been prepared it is passed through a solution of some suitable binder such for example as a phenolic or other synthetic resin. The number of times that the fabric is passed through the binder will depend on the conditions to be met. The method of impregnating fabrics by drawing or passing them through solutions of binders is well known in the art. The impregnated fabric is then dried and cut into blanks of the desired sizes and shapes. If the product that is to be made is a plate, a predetermined number of blanks or layers 11 of the fabric will be superimposed on one another and subjected to heat and pressure between the molding plates 12 and 13 of the hydraulically operated press illustrated diagrammatically in Fig. 2.

After heat and pressure have been applied for a predetermined time in accordance with the practice in the art, a finished plate such as 14 will be produced. If a spinning bucket such as illustrated at 15 in Fig. 4 is desired, the impregnated superimposed fabrics will be introduced into a molding press designed to give the blanks the desired shape.

Many different kinds of binders may be employed. It has been found that other acid resisting binders such as rubber, rubber derivatives, vinyl resins and other thermosetting and thermoplastic acid resisting resins may be used with success.

When vessels, plates and the like made in this manner, are subjected to acids such as sulphuric acids, the cellulosic material will be gradually attacked and caused to deteriorate. However, it has been found that there is present such a small proportion of the cellulosic material that even if it is partly or wholly destroyed, the vessel or apparatus thus fabricated from the blue asbestos and a binder will have sufficient strength for most purposes for which such vessels or apparatus are utilized.

In some instances, articles of manufacture such as spinning buckets for the artificial silk industry such as illustrated in Fig. 5 and many other articles may be fabricated by molding a mixture of a pulverized solid resin and an acid resistant asbestos with inserts 16 and reenforcing members 17 embodied therein. The inserts 16 and reenforcing members will be located at points where it is desired to increase the strength of the article.

This method for some purposes may result in a more economical structure.

The results obtained in this manner are highly satisfactory and are of great commercial value.

Since certain changes in carrying out the above processes and certain modifications in the article which embody the invention, may be made without departing from its scope, it is intended that all matter contained in the above description or shown in the accompanying drawing shall be interpreted as illustrative and not in a limiting sense.

I claim as my invention:

1. An acid resistant spinning bucket comprising a plurality of layers of a mixture of an organic fibrous material and an acid resistant asbestos woven into a fabric, the organic fibrous material being present only in sufficient quantities to enable the weaving of the mixture and a reacted acid resistant binder impregnating the layers of the fabric and binding it into a spinning bucket of predetermined shape, the asbestos being present in quantity sufficient to give the desired strength to the spinning bucket when the organic fibrous materials have been destroyed by an acid.

2. A molded laminated spinning bucket comprising a plurality of layers of fabric, the fabric consisting of a minor proportion of an organic fibrous material and a major proportion of an acid resistant asbestos and an acid resistant binder uniting the layers of fabric.

3. A molded laminated spinning bucket comprising a plurality of layers of fabric, the fabric consisting of a mixture of from 5% to 20%, by weight, of a cellulosic material and from 95% to 80%, by weight, of an acid resistant asbestos and an acid resistant binder uniting the layers of fabric.

4. In a molded laminated spinning bucket, a plurality of layers of fabric, a fabric consisting of a mixture of from 5% to 20%, by weight, of cotton and from 95% to 80%, by weight, of blue asbestos and an acid resistant binder uniting the layers of fabric.

GERALD H. MAINS.